(12) United States Patent
Naik et al.

(10) Patent No.: US 12,410,746 B1
(45) Date of Patent: Sep. 9, 2025

(54) GAS TURBINE AND FUEL NOZZLE ASSEMBLY FOR MIXING HYDROGEN FUEL AND STEAM TO CONTROL FLAME SPEED

(71) Applicant: General Electric Company, Cincinnati, OH (US)

(72) Inventors: Pradeep Naik, Bengaluru (IN); Clayton S. Cooper, Loveland, OH (US); Sibtosh Pal, Mason, OH (US); R Narasimha Chiranthan, Bengaluru (IN); Michael Pedota, Cincinnati, OH (US); Steven C. Vise, Loveland, OH (US); Michael T. Bucaro, Arvada, CO (US); Michael A. Benjamin, Cincinnati, OH (US); Andrew J. Wickersham, Liberty Township, OH (US); Karthikeyan Sampath, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/765,725

(22) Filed: Jul. 8, 2024

(51) Int. Cl.
*F02C 3/30* (2006.01)
*F02C 3/20* (2006.01)
*F02C 3/22* (2006.01)
*F02C 7/22* (2006.01)
*F23R 3/12* (2006.01)

(52) U.S. Cl.
CPC ............... *F02C 3/30* (2013.01); *F02C 3/20* (2013.01); *F02C 3/22* (2013.01); *F02C 7/222* (2013.01); *F23R 3/12* (2013.01)

(58) Field of Classification Search
CPC ...... F02C 3/20; F02C 3/22; F02C 3/30; F23R 3/12; F23R 3/14; F23R 3/28
See application file for complete search history.

(56) References Cited

U.S. PATENT DOCUMENTS

| | | | | |
|---|---|---|---|---|
| 1,278,314 | A * | 9/1918 | Dix | F02C 5/02 60/39.55 |
| 5,054,279 | A * | 10/1991 | Hines | F01K 21/047 60/39.5 |
| 5,735,681 | A | 4/1998 | Cheng | |
| 5,983,622 | A * | 11/1999 | Newburry | F23N 5/003 60/773 |
| 6,418,724 | B1 * | 7/2002 | Cheng | F23D 14/68 60/776 |
| 6,802,178 | B2 | 10/2004 | Sprouse et al. | |

(Continued)

FOREIGN PATENT DOCUMENTS

| | | | | |
|---|---|---|---|---|
| DE | 112014004695 B4 * | 8/2022 | | F01K 21/047 |
| JP | 6722491 B2 * | 7/2020 | | F02C 3/30 |
| WO | WO-2016056579 A1 * | 4/2016 | | F01D 9/023 |

*Primary Examiner* — William H Rodriguez
(74) *Attorney, Agent, or Firm* — Carter, DeLuca & Farrell LLP

(57) ABSTRACT

A gas turbine engine comprising a compressor section, a combustion section, and a turbine section in a serial flow arrangement, with the combustion section comprising a combustor liner that at least partially defines a combustion chamber; and a gaseous fuel nozzle assembly, comprising: a steam supply to supply steam; a hydrogen fuel supply to supply gaseous hydrogen fuel; and a fuel nozzle body fluidly coupled with the steam supply and the hydrogen fuel supply.

14 Claims, 13 Drawing Sheets

(56) References Cited

U.S. PATENT DOCUMENTS

| | | | |
|---|---|---|---|
| 7,013,648 | B2 | 3/2006 | Griffin et al. |
| 7,870,736 | B2 | 1/2011 | Homitz et al. |
| 8,931,283 | B2 | 1/2015 | Khan et al. |
| 9,752,458 | B2 | 9/2017 | Huntington et al. |
| 9,803,865 | B2 | 10/2017 | Antoniono et al. |
| 10,480,792 | B2 * | 11/2019 | Slobodyanskiy ......... F02C 3/34 |
| 10,935,245 | B2 | 3/2021 | Boardman et al. |
| 11,156,360 | B2 | 10/2021 | Boardman et al. |
| 11,692,709 | B2 | 7/2023 | Naik et al. |
| 12,038,177 | B1 * | 7/2024 | Kramer .................... F02C 3/30 |
| 2007/0277528 | A1 * | 12/2007 | Homitz ................... F23D 14/58 |
| | | | 60/737 |
| 2009/0011063 | A1 | 1/2009 | Davie et al. |
| 2014/0109582 | A1 | 4/2014 | Shershnyov et al. |
| 2022/0333783 | A1 * | 10/2022 | Toqan .................... F01K 23/10 |
| 2023/0204213 | A1 | 6/2023 | Naik et al. |

* cited by examiner

GAS TURBINE AND FUEL NOZZLE ASSEMBLY FOR MIXING HYDROGEN FUEL AND STEAM TO CONTROL FLAME SPEED

TECHNICAL FIELD

The present subject matter relates generally to a gas turbine engine having a fuel nozzle assembly.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the gas turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called $NO_x$), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

DETAILED DESCRIPTION

Figure 1:
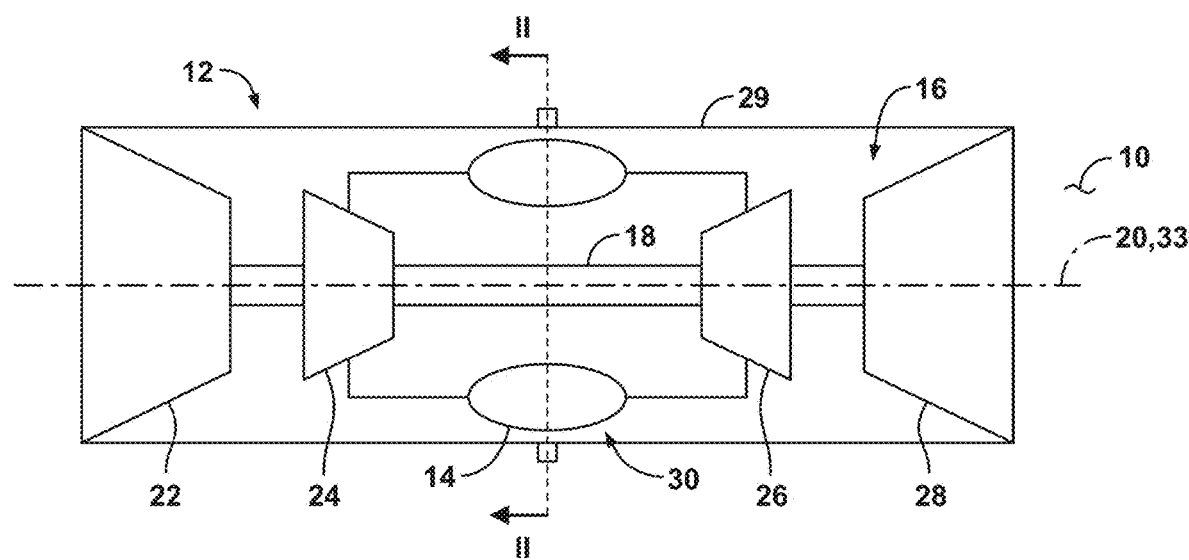
FIG. 1 is a schematic view of a gas turbine engine having a compression section, a combustion section, and a turbine section in accordance with various aspects described herein.

Aspects of the disclosure described herein are directed to a combustor and a fuel nozzle assembly for a combustor. With some aspects, the disclosed combustors and fuel nozzle assemblies can be utilized with gaseous fuel, such as hydrogen. Gaseous fuel, including hydrogen, spreads/disperses at a faster rate than atomized liquid fuel, which can involve less mixing time for the gaseous fuel, fuel mixing tube lengths can be shorter, and the flame from the gaseous fuel may be more likely to spread farther and faster, which can increase the risk of flashback and flameholding (e.g., in a nozzle or mixer), and increase the impact of controlling the flame and limiting flame spread by controlling the dispersion of the gaseous fuel.

With fuel nozzle assemblies disclosed herein, mixing gaseous hydrogen with steam can limit flame speeds, which can limit flashback and flameholding. Introduction of steam also reduces peak temperatures and $NO_x$ emissions. Introducing steam around hydrogen fuel can limit radial spread of the flame and reduce wall and liner temperatures. Steam can be mixed with gaseous hydrogen before the fuel nozzle in fluid passages or in a mixing chamber. Steam can be introduced with gaseous hydrogen via one or more orifices inside the fuel nozzle assembly such that steam and gaseous hydrogen mix close to fuel nozzle tip without damaging the fuel nozzle assembly or the swirler. Steam can be injected at different locations along the fuel nozzle body to facilitate mixing with fuel, such as gaseous hydrogen. Steam can be injected around an outermost circuit of the fuel nozzle assembly to control the shape of the flame and to reduce wall and liner temperatures. Steam can be injected at all engine operating conditions or at certain operating conditions to reduce $NO_x$ emissions or to control the shape of the flame for lower wall and liner temperatures, or to limit flashback and flameholding. Steam and gaseous hydrogen can be introduced through one or multiple outlets. Steam can be introduced between fuel outputs to control flame shape and to reduce regions of high temperatures to limit $NO_x$ emissions. Steam can be injected between gaseous hydrogen and air to delay interaction between gaseous hydrogen and air in the low velocity regions close to the wall, which can limit flashback and flameholding.

While described with respect to a turbine engine, it should be appreciated that the combustor as described herein can be for any engine having a combustor. It should be appreciated that application of aspects of the disclosure discussed herein are applicable to engines with propeller sections or fan and booster sections along with turbojets and turbo engines as well.

For purposes of illustration, the present disclosure will be described with respect to a turbine engine. It will be understood, however, that aspects of the disclosure described herein are not so limited. A combustor as described herein can be implemented in various engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

With the combustors and fuel nozzle assemblies described herein, gaseous hydrogen fuel can be used without the need of diluents. In some embodiments, no diluent is added to the combustion chamber and the fuel is substantially completely diatomic hydrogen without diluent. As used herein, the term "substantially completely," as used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", etc. may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

The term "nozzle" has been used in various ways in the context of gas turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

Additionally, as used herein, a "controller" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the gas turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about and enshroud one or more sections of the gas turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 can include a combustor 30.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
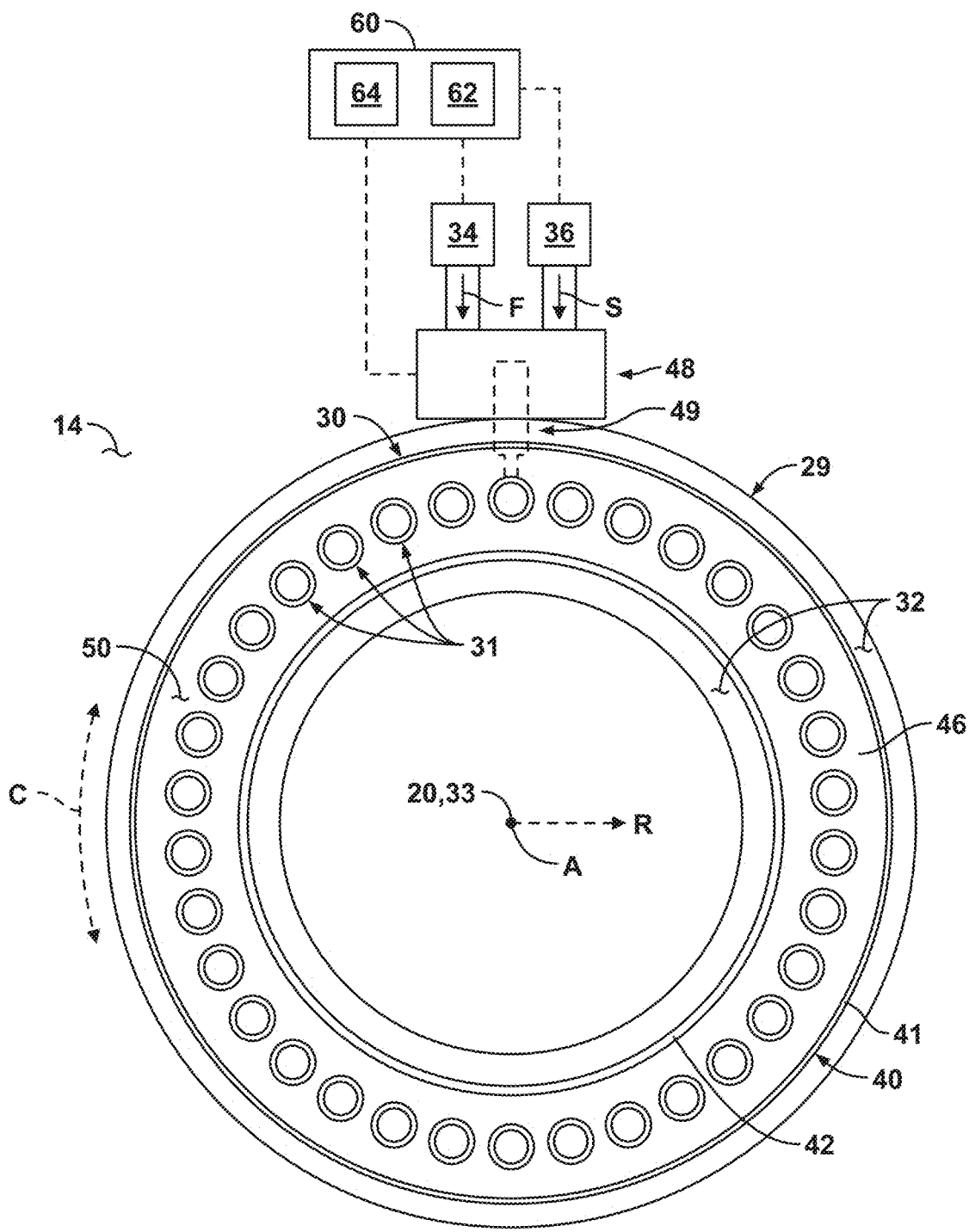
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustor 30 can include an annular arrangement of combustor portions 31 disposed around the centerline or rotational axis 20 of the gas turbine engine 10 (e.g., circumferentially spaced from each other in an annular configuration) (FIG. 1). The combustor portions 31 can, in some configurations, include or be configured as combustor cups, fuel cups, or nozzle cups. A fuel nozzle assembly 48 can be connected to each combustor portion 31. The combustor 30 can have a can, can-annular, or annular arrangement depending on the type of engine in which the combustor 30 is located. In a non-limiting example, the combustor 30 can have a combination arrangement located with a shroud or casing 29 of the gas turbine engine 10 (FIG. 1). The shroud or casing 29 can enshroud or cover at least a portion of the combustion section 14.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. In some examples, the combustor liner 40 can have an annular structure about the combustor 30. In some examples, the combustor liner 40 can include multiple segments or portions collectively forming the combustor liner 40. In some examples, the combustor liner 40 can include the outer liner 41 radially spaced from the inner liner 42. In some examples, the combustor liner 40 can include a single liner.

The combustor liner 40 can at least partially define a combustion chamber 50 arranged annularly about the rotational axis 20. For example, a wall 46 (e.g., a dome wall) may be substantially perpendicular to the rotational axis 20 and can cooperate with the outer liner 41, the inner liner 42, or both, to at least partially define the combustion chamber 50. A compressed air passage 32 can be defined at least in part by both the combustor liner 40 and the casing 29.

The combustor 30 can include or be fluidly coupled to a fuel supply 34 (e.g., a fuel manifold or conduit), a steam supply 36 (e.g., a steam manifold or conduit), or both. The fuel nozzle assembly 48 fluidly couples the fuel supply 34 and the steam supply 36 with one of the combustor portions 31 and the combustion chamber 50. The fuel nozzle assembly 48 can include a fuel nozzle body 49. The fuel nozzle assembly 48 is coupled to the wall 46. A fuel F can include any suitable fuel, including gaseous fuel, such as hydrogen fuel, in non-limiting examples, which can include 100% $H_2$ (e.g., without a diluent). For example, the fuel nozzle assembly 48 can be a gaseous fuel nozzle assembly, such as a gaseous hydrogen fuel nozzle assembly, and the fuel supply 34 can be a hydrogen fuel supply. In some examples, other fuels can be utilized instead of or with hydrogen. For example, the fuel F can comprise methane, such as in the form of natural gas, highly reactive fuels, or combinations thereof, with or without hydrogen. The combustor portions 31 can be arranged a circumferentially spaced configuration. The combustor portions 31 can be disposed at a radial distance from the rotational axis 20 that is greater than a radial distance of the inner liner 42 and less than a radial distance of the outer liner 41. A controller 60 can be connected to and at least partially control operation of the fuel supply 34, the steam supply 36, the fuel nozzle assembly 48, or combinations thereof. The controller 60 can include a processor 62 and a memory 64. A centerline 33 of the combustion section 14 can be concentric with the rotational axis 20. The centerline 33 can define a radial direction R, an axial direction A, and a circumferential direction C.

Figure 3:
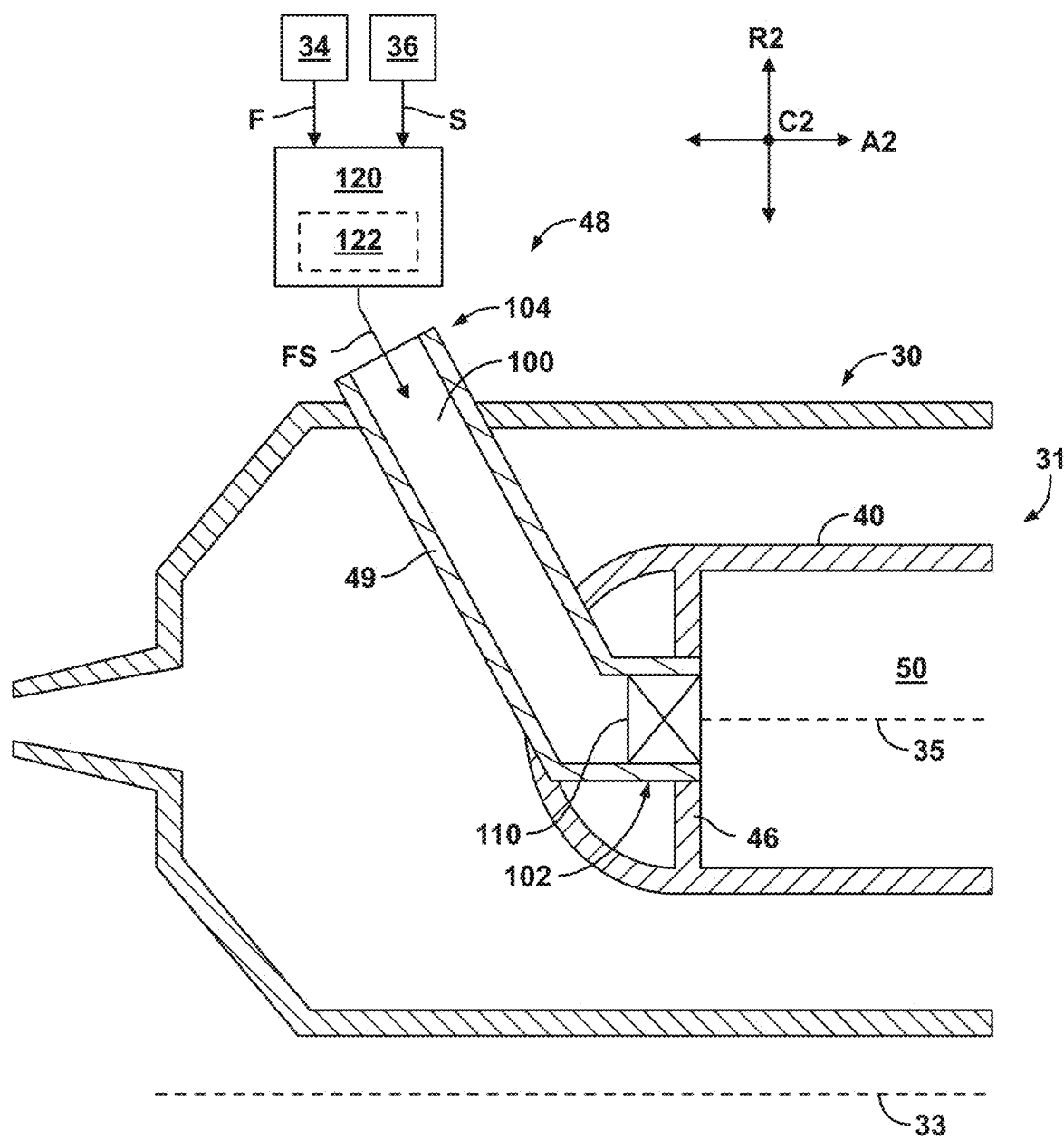
FIG. 3 is a schematic cross-sectional view illustrating portions of a fuel nozzle assembly coupled to a combustion chamber in accordance with various aspects described herein.

FIG. 3 is a schematic view of an example of one of the combustor portions 31 of the combustor 30. The combustor portion 31 can be provided, at least in part, by the fuel nozzle assembly 48. The fuel nozzle assembly 48 can be coupled to the wall 46, extend into the wall 46, extend through the wall 46, or combinations thereof. The fuel nozzle assembly 48 can include a fuel nozzle assembly centerline 35 that is parallel with and radially offset from the centerline 33. The fuel nozzle assembly centerline 35 can be concentric with a centerline of the combustor portion 31 to which the fuel nozzle assembly 48 is coupled. The fuel nozzle assembly centerline 35 can define a second axial direction A2, a second radial direction R2 perpendicular to the second axial direction A2, and a second circumferential direction C2 about the second axial direction A2. The second axial direction A2 can be parallel to the axial direction A (FIG. 2).

The fuel nozzle body 49 of the fuel nozzle assembly 48 can include a fluid passage 100 extending from a first end 102 (e.g., an outlet) of the fuel nozzle body 49 coupled to the wall 46 to a second end 104 (e.g., an inlet) of the fuel nozzle body 49 disposed opposite the first end 102. A swirler 110 can be disposed in the fluid passage 100, such as at the first end 102. A manifold 120 defining a mixing chamber 122 fluidly coupled with the fluid passage 100 at the second end 104 can be included in the fuel nozzle assembly 48. The manifold 120 can be separate from or included with the fuel nozzle body 49. The mixing chamber 122 is fluidly coupled with the fuel supply 34 and the steam supply 36 such that fuel F and steam S mix in the mixing chamber 122 and a resulting fuel-steam mixture FS is output from the mixing chamber 122 to the fluid passage 100. The fluid passage 100 fluidly couples the mixing chamber 122 with the combustion chamber 50 such that the fuel-steam mixture FS is provided to the combustion chamber 50. Mixing fuel F with steam S upstream of the combustion chamber 50, such as within the mixing chamber 122, can limit flame speeds, flashback, and flameholding in the fuel nozzle assembly 48. A ratio of steam S to fuel F in the fuel-steam mixture FS can, for example, be at least 0.01 and less than or equal to 10. The ratio can be controlled by the controller 60 (FIG. 2), such as via one or more valves of the fuel supply 34, the steam supply 36, the manifold 120, or combinations thereof.

Figure 4:
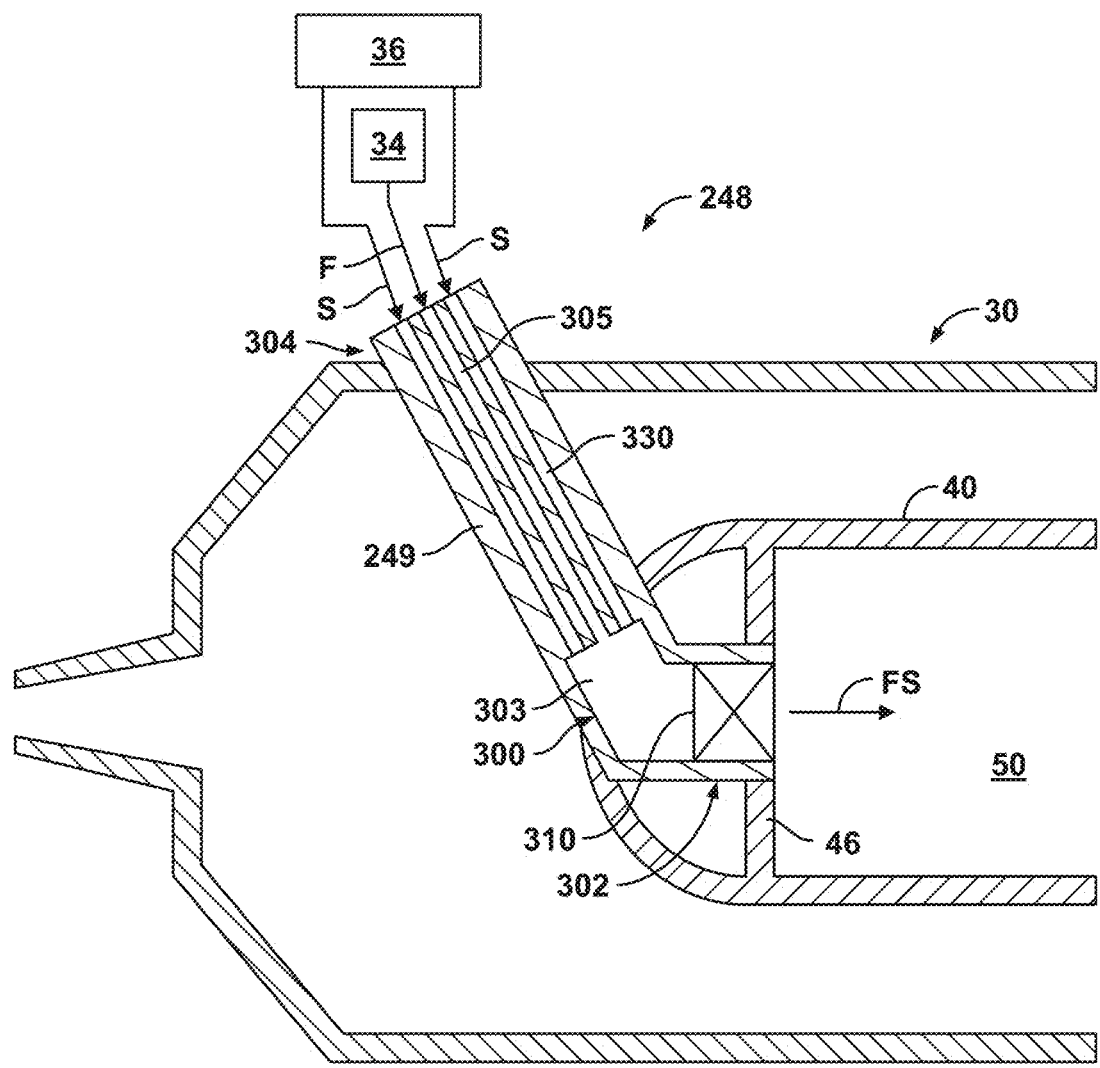
FIG. 4 is a schematic cross-sectional view illustrating portions of a fuel nozzle assembly coupled to a combustion chamber in accordance with various aspects described herein.
Figure 5:
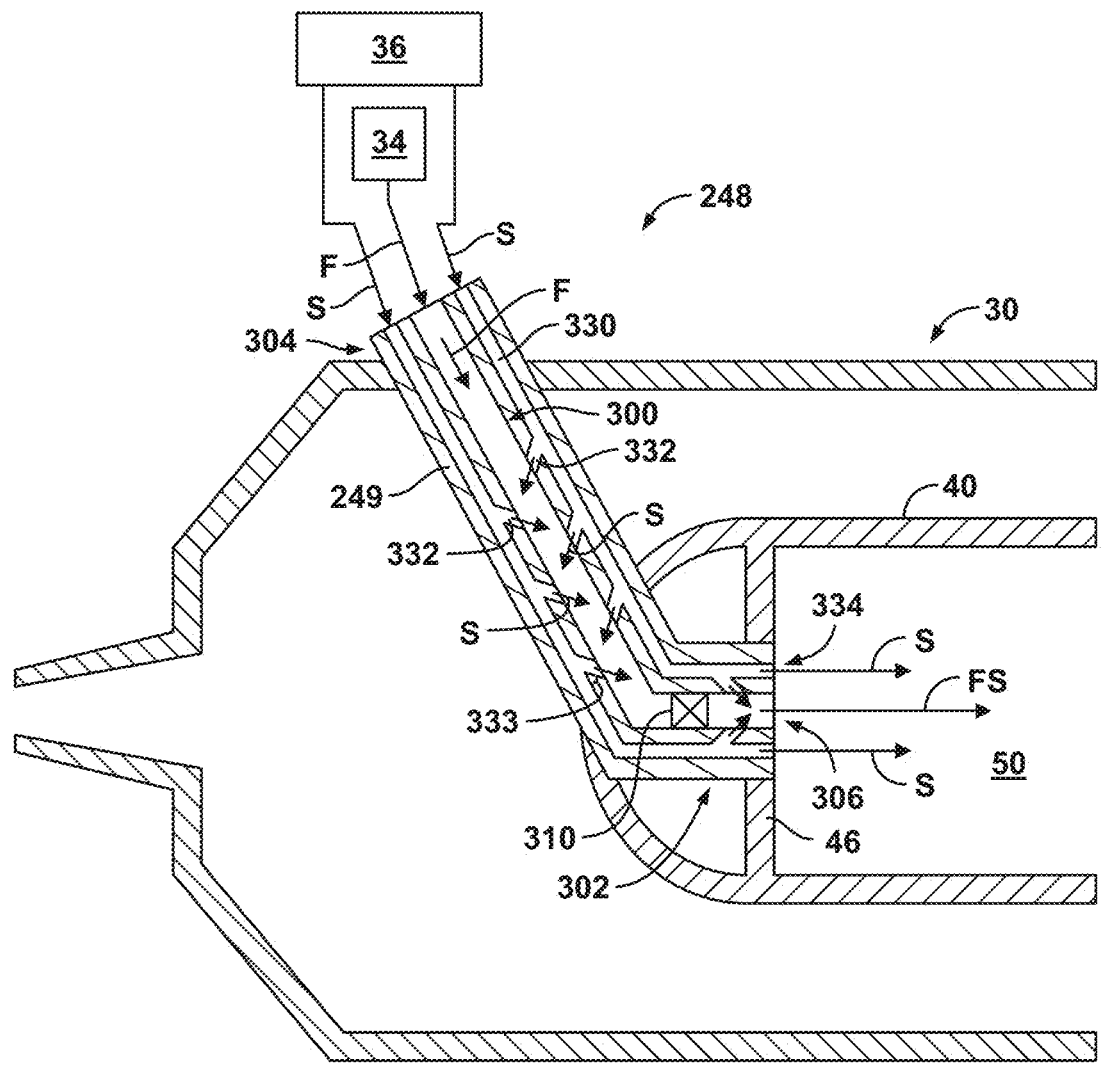
FIG. 5 is a schematic cross-sectional view illustrating portions of a fuel nozzle assembly coupled to a combustion chamber in accordance with various aspects described herein.

Referring to FIGS. 4 and 5, a fuel nozzle assembly 248 that can be utilized in the combustor 30 and coupled to the combustor liner 40, the wall 46, or both, is illustrated. The fuel nozzle assembly 248 can include aspects similar to those of the fuel nozzle assembly 48; therefore, like parts will be described with like numerals further increased by 200, with it being understood that the description of the like parts of the fuel nozzle assembly 48 can apply to the fuel nozzle assembly 248, except where noted. For example, the fuel nozzle assembly 248 can include a fuel nozzle body 249 and a first fluid passage 300. The fuel nozzle assembly 248 can provide the fuel-steam mixture FS to the combustion chamber 50. The fuel nozzle body 249 can include a first end 302 coupled to the wall 46 and a second end 304 opposite the first end 302. A swirler 310 can be disposed in the first fluid passage 300, such as at the first end 302.

Referring to FIG. 4, the first fluid passage 300 can include a first section 303 and a second section 305 fluidly coupled with the first section 303. The first section 303 can extend from the first end 302 to the second section 305. The second section 305 can extend from the first section 303 to the second end 304 and be fluidly coupled with the fuel supply 34 to provide fuel F to the first section 303.

The fuel nozzle assembly 248 can include a second fluid passage 330 that can be at least partially defined by the fuel nozzle body 249. The second fluid passage 330 can extend from the second end 304 to the first section 303 of the first fluid passage 300. The second fluid passage 330 can be fluidly coupled with the steam supply 36 to provide steam S from the second end 304 to the first section 303 of the first fluid passage 300. In some examples, the second fluid passage 330 can include an annular configuration disposed at least partially around the second section 305. The first section 303 of the first fluid passage 300 can receive fuel F from the second section 305 and steam S from the second fluid passage 330. Fuel F and steam S can mix together in the first section 303 to form the fuel-steam mixture FS that flows into the combustion chamber 50. For example, the first section 303 can include a greater cross-sectional area than the second section 305, the second fluid passage 330, or both, and the first section 303 can function as a premixing chamber. The swirler 310, which can be disposed in the first section 303, can facilitate mixing of fuel F and steam S in the fuel nozzle body 249 upstream of the combustion chamber 50 (e.g., in the first section 303), which can limit flame speed, limit flashback, and limit flameholding in the fuel nozzle assembly 248.

Referring to FIG. 5, the second fluid passage 330 of the fuel nozzle assembly 248 can extend from the second end 304 to the first end 302 and can include one or more steam orifices 332 (e.g., internal orifices) fluidly coupling the second fluid passage 330 to the first fluid passage 300 to provide steam S into the first fluid passage 300 at one or more locations along the first fluid passage 300. The steam orifices 332 can facilitate mixing of fuel F with steam S upstream of the combustion chamber 50. In some examples, one or more of the steam orifices 332 can be perpendicular to the flow direction of fuel F through the first fluid passage 300, which can increase penetration of the steam S into the flowing fuel F. Additionally or alternatively, one or more of the steam orifices 332 can be angled downstream, at least to some degree, relative to a flow direction of fuel F through the first fluid passage 300 (e.g., at an angle 333 between directly downstream and perpendicular to the flow direction), which can limit wakes. In nonlimiting examples, the angle 333 can be greater than 0 degrees and less than or equal 45 degrees, or greater than 0 degrees and less than or equal to 30 degrees, which can increase the concentration of steam S along the surface of the second fluid passage 330 to limit flashback and flameholding. The one or more steam orifices 332 can include a plurality of steam orifices with at least one steam orifice upstream of the swirler 310 (e.g., to facilitate mixing of steam S and fuel F) and at least one steam orifice downstream of the swirler 310 (e.g., for flame shaping). The second fluid passage 330 can include a combustion chamber outlet 334 fluidly coupled with the combustion chamber 50 to emit steam S into the combustion chamber 50. The combustion chamber outlet 334 can include a plurality of outlets or a single outlet, such as an annular outlet, arranged about an outlet 306 of the first fluid passage 300 disposed at or in the combustion chamber 50.

The combustion chamber outlet 334 of the second fluid passage 330 can emit steam S directly into the combustion chamber 50, such as for flame shaping. For example, emitting steam S around the fuel-steam mixture FS emitted from the outlet 306 can limit flow of fuel F toward the combustor liner 40 (e.g., radial spread), toward or along the wall 46, or a combination thereof, which can limit temperatures along the combustor liner 40, the wall 46, or both.

Referring to FIGS. 6-9, a fuel nozzle assembly 448 that can be utilized in the combustor 30 (FIG. 1) and coupled to the combustor liner 40, the wall 46, or both, is illustrated. The fuel nozzle assembly 448 can include aspects similar to those of the fuel nozzle assemblies 48 (FIG. 3), 248 (FIGS. 4 and 5); therefore, like parts will be described with like numerals further increased by 200 relative to the fuel nozzle assembly 248 of FIGS. 4 and 5, with it being understood that the description of the like parts of the fuel nozzle assembly 48, 248 can apply to the fuel nozzle assembly 448, except where noted. For example, the fuel nozzle assembly 448 can include a fuel nozzle body 449, can include a first fluid passage 500, can include a second fluid passage 530, and can fluidly couple the fuel supply 34 and the steam supply 36 to the combustion chamber 50 to provide fuel F, steam S, the fuel-steam mixture FS, or combinations thereof to the combustion chamber 50. The fuel nozzle body 449 can include a first end 502 coupled to the wall 46 and a second end 504 opposite the first end 502. The first fluid passage 500 includes an outlet 506 at or in the combustion chamber 50. A first swirler 510 can be disposed in the first fluid passage 500, such as at the first end 502.

The fuel nozzle assembly 448 can include an outer wall 540 that can be disposed radially outward of the fuel nozzle body 449, such as at the first end 502. The outer wall 540 can be spaced from the first end 502 of the fuel nozzle body 449 such that a first outer fluid passage 542 is formed between the fuel nozzle body 449 and the outer wall 540. A second swirler 512 can be disposed in the first outer fluid passage 542. In some examples, the second swirler 512 can mechanically couple the outer wall 540 with the fuel nozzle body 449. The first outer fluid passage 542 can be fluidly coupled to a source of air 70, such as the compressor section 12 (FIG. 1). The fuel nozzle assembly 448 can include a steam conduit 536 fluidly coupled with the second fluid passage 530. The steam conduit 536 can extend from the second fluid passage 530 radially outward, such as into or through the first outer fluid passage 542, into or through the second swirler 512, into or through the outer wall 540, or a combination thereof.

Figure 6:
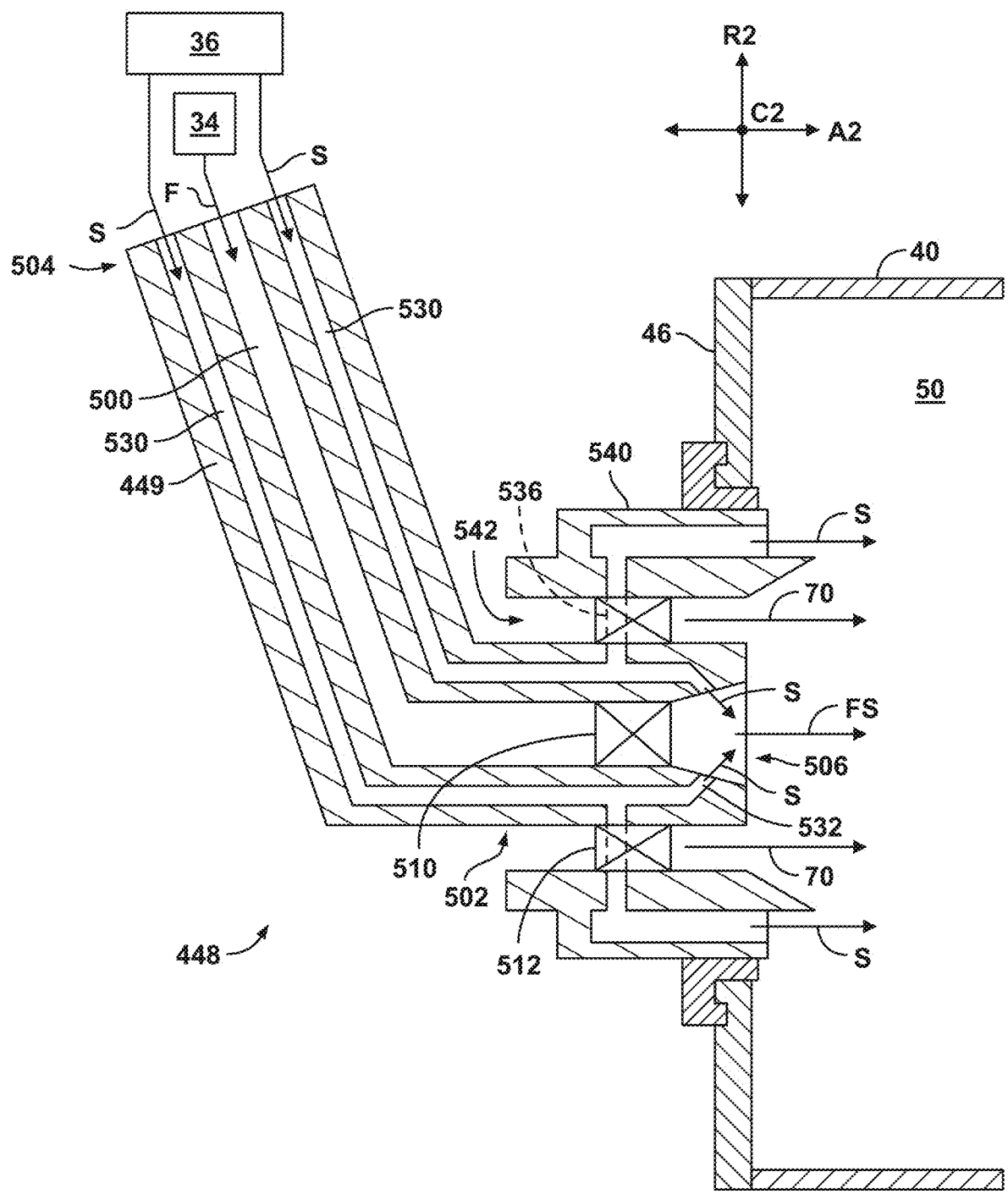
FIG. 6 is a schematic cross-sectional view illustrating portions of a fuel nozzle assembly coupled to a combustion chamber in accordance with various aspects described herein.

Referring to FIG. 6, in some examples, the steam conduit 536 extends radially into the outer wall 540 and extends aft in the second axial direction A2 through the outer wall 540 to emit steam S from the outer wall 540 into the combustion chamber 50. Steam S emitted from the steam conduit 536 through the outer wall 540 can provide flame shaping and limit outward spread of flames in the combustion chamber 50, such as to limit temperatures at the combustor liner 40, the wall 46, or both. The second fluid passage 530 can include a steam orifice 532 at the first end 502 that fluidly couples the second fluid passage 530 with the first fluid passage 500 upstream of the combustion chamber 50 such that the first fluid passage 500 emits the fuel-steam mixture FS from the outlet 506 into the combustion chamber 50.

Figure 7:
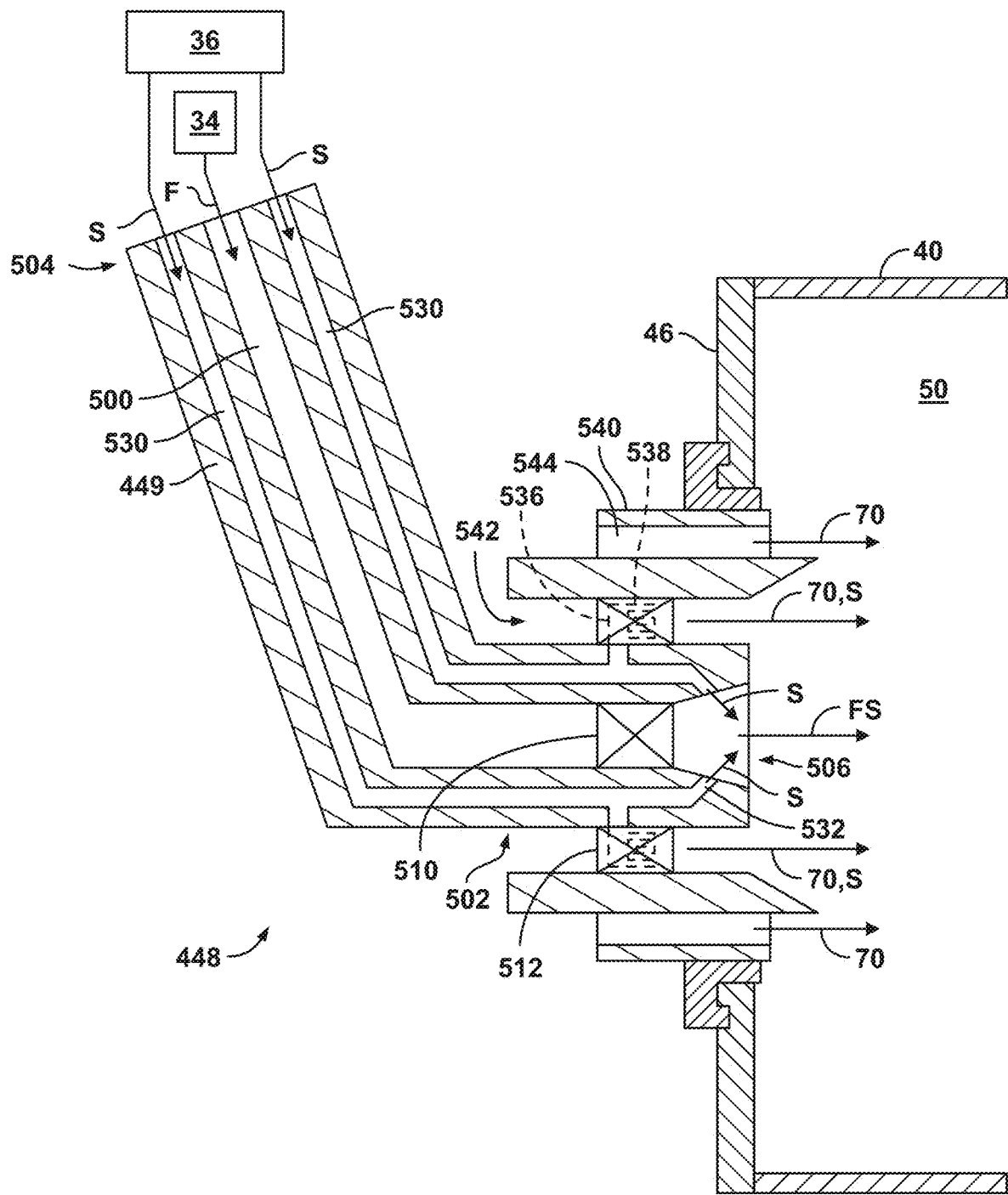
FIG. 7 is a schematic cross-sectional view illustrating portions of a fuel nozzle assembly coupled to a combustion chamber in accordance with various aspects described herein.

Referring to FIG. 7, in some examples, the steam conduit 536 extends radially outward from the fuel nozzle body 449 into the first outer fluid passage 542 and includes one or more steam conduit outlets 538 disposed in the first outer fluid passage 542. The steam conduit outlets 538 can extend aft, at least to some degree, to emit steam S into the combustion chamber 50, the first outer fluid passage 542, or both. Emitting steam S into the first outer fluid passage 542 can facilitate mixing of steam S with air 70. The steam conduit 536 and the steam conduit outlets 538 can be disposed in the second swirler 512 (e.g., circumferentially between adjacent vanes), forward of the second swirler 512, aft of the second swirler 512, or combinations thereof. Emitting steam S into the first outer fluid passage 542 and from the first outer fluid passage 542 into the combustion chamber 50 can reduce $NO_x$ emissions and control the flame position aft of the wall 46. For example, increasing the amount of steam S mixed with fuel F and air 70 reduces flame speed, which moves the flame farther aft, and the mass of steam S increases the velocity of the mixture, which also pushes the flame farther aft. The output of the first outer fluid passage 542 can be a combination or mixture of steam S and air 70. The outer wall 540 can include an air passage 544 to provide air 70 (e.g., without steam S or fuel F) to the combustion chamber 50. The air passage 544 can be radially outward of the first outer fluid passage 542. The second fluid passage 530 can include the steam orifice 532 fluidly coupling the second fluid passage 530 with the first fluid passage 500 upstream of the combustion chamber 50 such that the first fluid passage 500 emits the fuel-steam mixture FS from the outlet 506 into the combustion chamber 50.

Figure 8:
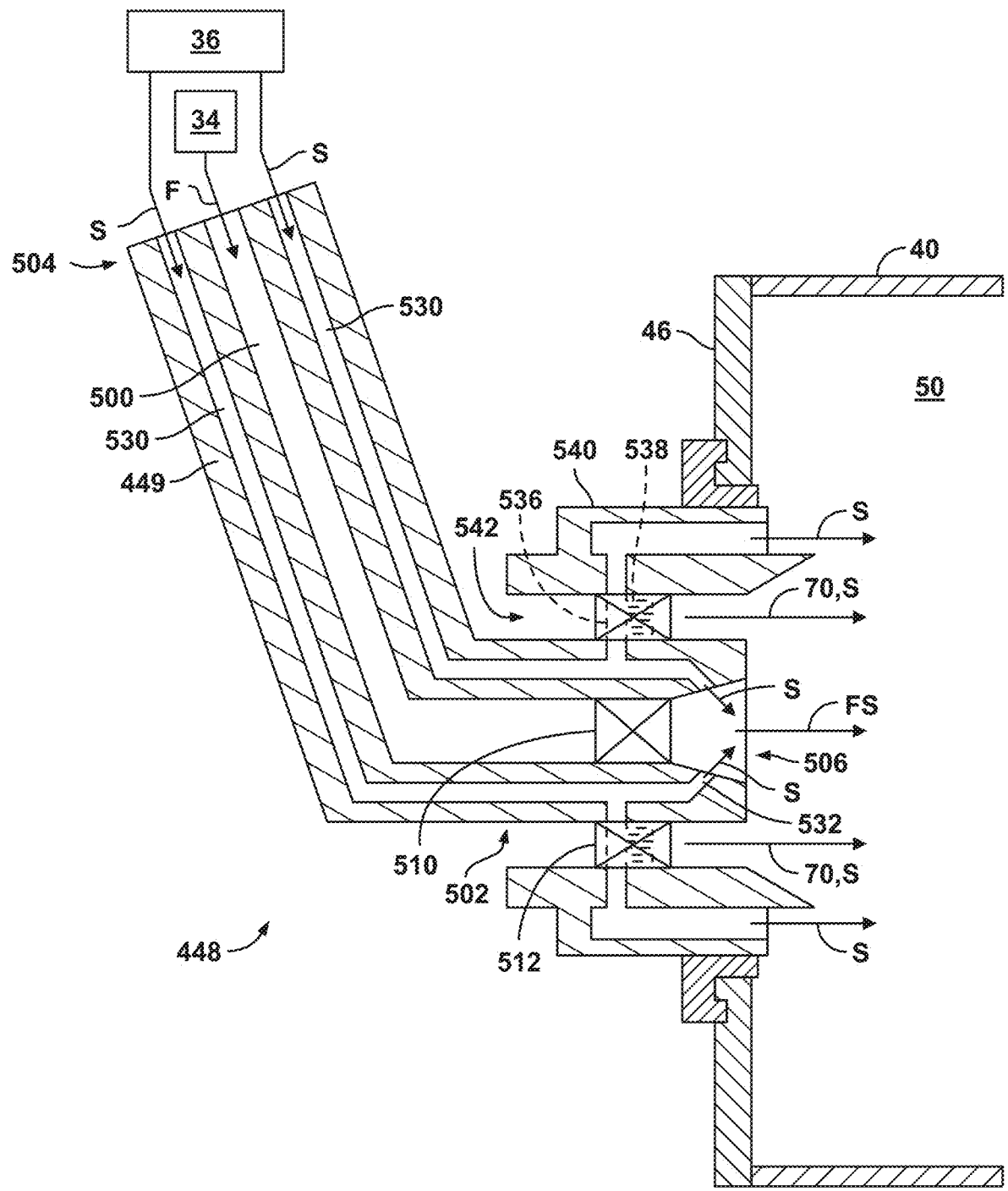
FIG. 8 is a schematic cross-sectional view illustrating portions of a fuel nozzle assembly coupled to a combustion chamber in accordance with various aspects described herein.

Referring to FIG. 8, in some examples, the fuel nozzle assembly 448 can include a combination of the configurations of the steam conduit 536 shown in FIGS. 6 and 7. For example, the steam conduit 536 can extend radially into and axially through the outer wall 540 to emit steam S through the outer wall 540 into the combustion chamber 50 and can include steam conduit outlets 538 disposed in the first outer fluid passage 542 (e.g., in the second swirler 512) to emit a mixture of steam S and air 70 from the first outer fluid passage 542 into the combustion chamber 50.

Figure 9:
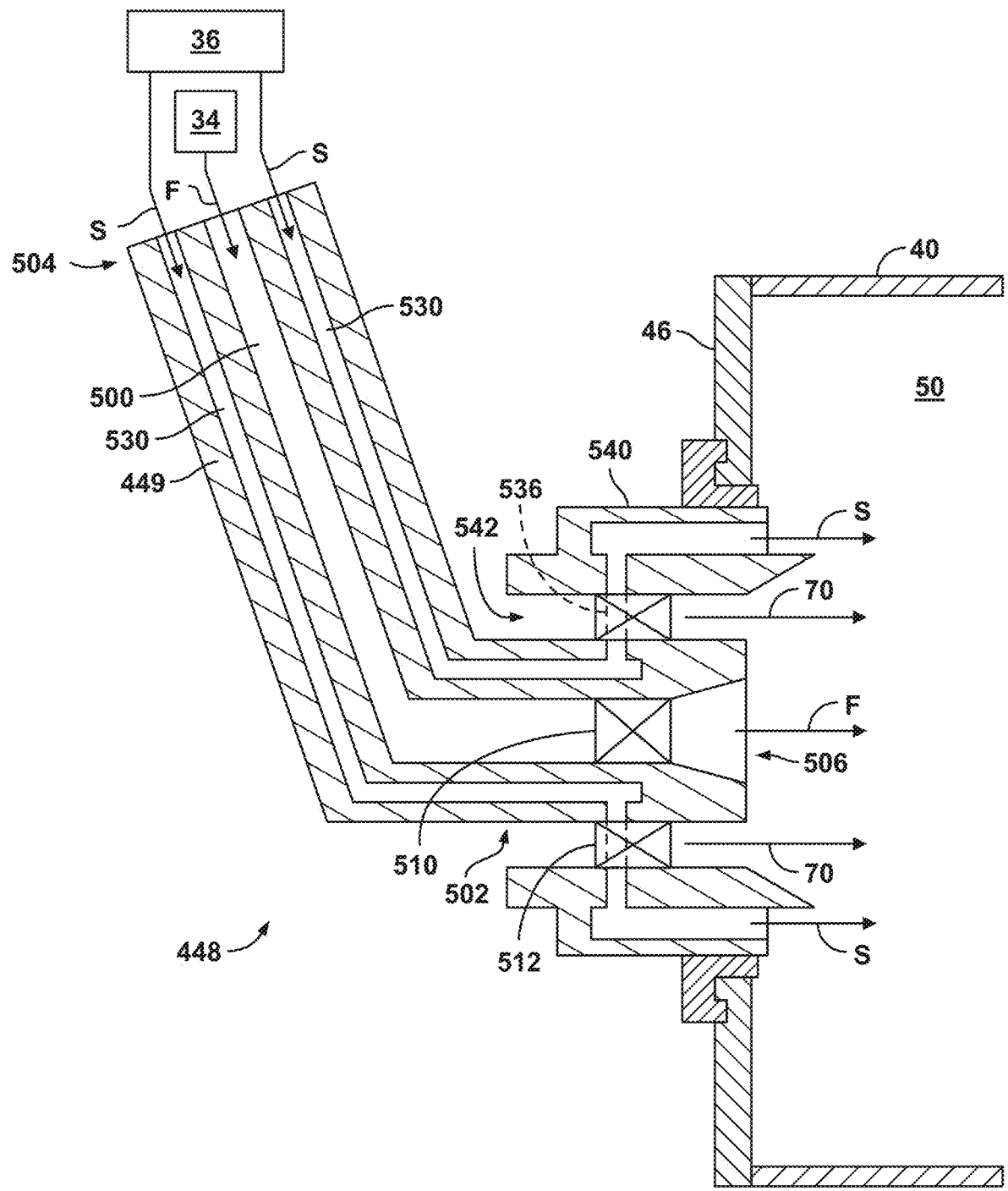
FIG. 9 is a schematic cross-sectional view illustrating portions of a fuel nozzle assembly coupled to a combustion chamber in accordance with various aspects described herein.

Referring to FIG. 9, the second fluid passage 530 can be fluidly coupled to the steam conduit 536 and may not be fluidly coupled with the first fluid passage 500. For example, the first fluid passage 500 can be fluidly coupled with the fuel supply 34 such that the output from the outlet 506 is fuel F without steam S, and the second fluid passage 530 can provide steam S to the first outer fluid passage 542, the outer wall 540, or both. In some examples, the first fluid passage 500 can be fluidly coupled with the fuel supply 34 and the steam supply 36, such as via a manifold (e.g., manifold 120 in FIG. 3), such that the output from the outlet 506 is the fuel-steam mixture FS (FIG. 3).

Figure 10:
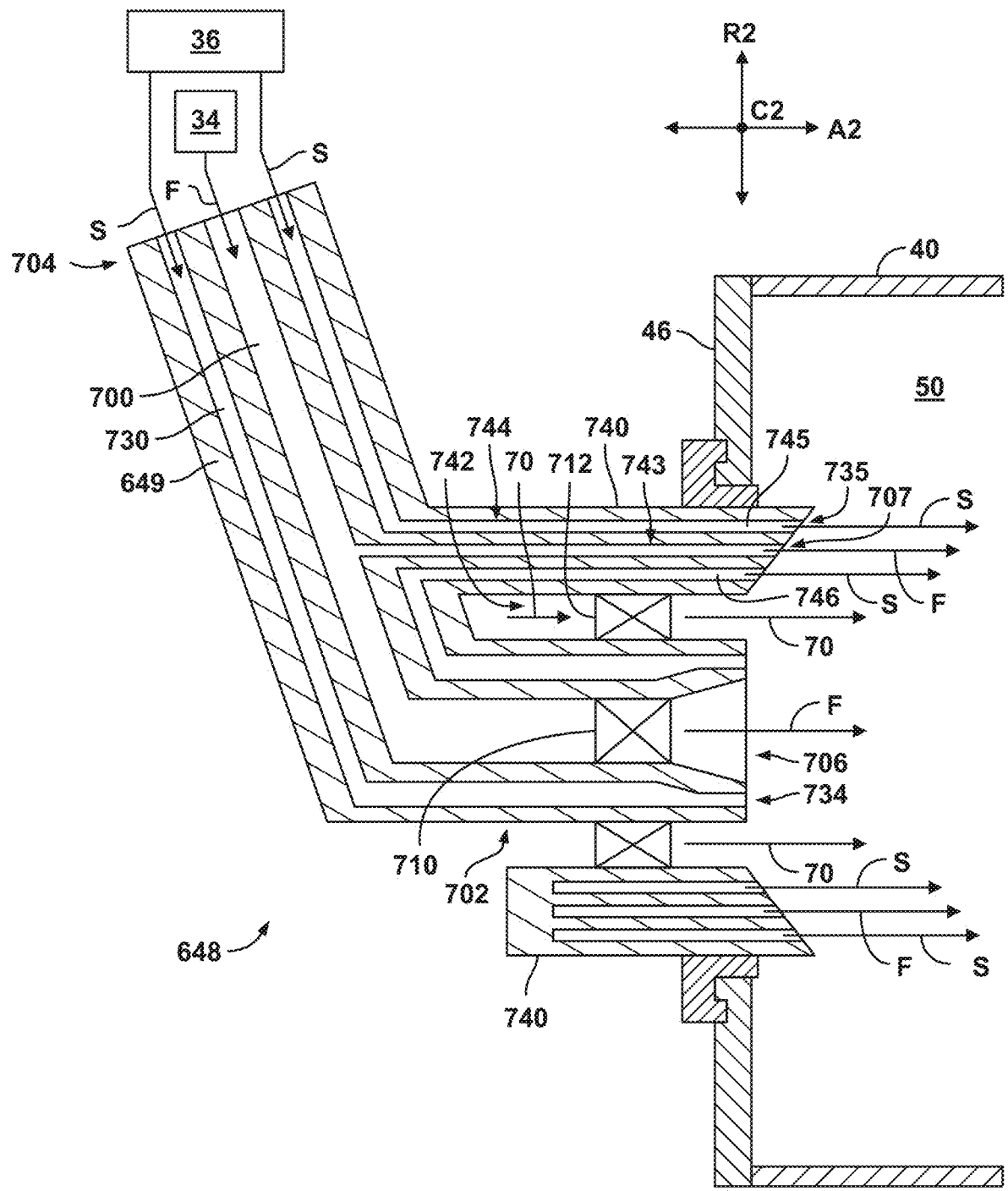
FIG. 10 is a schematic cross-sectional view illustrating portions of a fuel nozzle assembly coupled to a combustion chamber in accordance with various aspects described herein.

Referring to FIG. 10, a fuel nozzle assembly 648 that can be utilized in the combustor 30 (FIG. 1) and coupled to the combustor liner 40, the wall 46, or both, is illustrated. The fuel nozzle assembly 648 can include aspects similar to those of the fuel nozzle assemblies 48 (FIG. 3), 248 (FIGS. 4 and 5), 448 (FIGS. 6-9); therefore, like parts will be described with like numerals further increased by 200 relative to the fuel nozzle assembly 448 of FIGS. 6-9, with it being understood that the description of the like parts of the fuel nozzle assembly 48, 248, 448 can apply to the fuel nozzle assembly 648, except where noted. For example, the fuel nozzle assembly 648 can include a fuel nozzle body 649, can include a first fluid passage 700, can include a second fluid passage 730, can include an outer wall 740, and can fluidly couple the fuel supply 34 and the steam supply 36 to the combustion chamber 50 to provide fuel F and steam S to the combustion chamber 50. The fuel nozzle body 649 can include a first end 702 coupled to the wall 46 and a second end 704 opposite the first end 702. The first fluid passage 700 can include an outlet 706 at or in the combustion chamber 50. A first swirler 710 can be disposed in the first fluid passage 700, such as at the first end 702.

The second fluid passage 730 can include a combustion chamber outlet 734 fluidly coupling the second fluid passage 730 with the combustion chamber 50. In some examples, the second fluid passage 730 is not fluidly coupled with the first fluid passage 700 such that the first fluid passage 700 emits fuel F without steam S through the outlet 706 into the combustion chamber 50. The outer wall 740 can radially spaced from first end 702 of the fuel nozzle body 649 such that a first outer fluid passage 742 is defined between the fuel nozzle body 649 and the outer wall 740. A second swirler 712 can be disposed in the first outer fluid passage 742. The first outer fluid passage 742 can be fluidly coupled with a source of air 70, such as the compressor section 12 (FIG. 1). In some examples, the first outer fluid passage 742 can include a portion that extends (e.g., radially) through the outer wall 740, such as for fluid coupling with the source of air 70.

The first fluid passage 700 can include a segment 743 that extends into and through the outer wall 740 (e.g., in the second axial direction A2) to emit fuel F through the outer wall 740 into the combustion chamber 50. For example, the segment 743 can provide the first fluid passage 700 with a second outlet 707 fluidly coupled with the combustion chamber 50. The segment 743 can be spaced radially outward from the first end 702 of the fuel nozzle body 649. The segment 743 can include a single segment (e.g., an annular segment) or a plurality of segments, such as circumferentially spaced segments disposed in a circumferential row.

The second fluid passage 730 can include a segment 744 that extends into and through the outer wall 740 (e.g., in the second axial direction A2) to emit steam S through the outer wall 740 into the combustion chamber 50. For example, the segment 744 can provide the second fluid passage 730 with a second combustion chamber outlet 735 fluidly coupled with the combustion chamber 50. The segment 744 can be spaced radially outward from a first end 702 of the fuel nozzle body 649. The segment 744 can include a single segment or a plurality of segments, such as circumferentially spaced segments in one or more circumferential rows. The segment 744 can be disposed about the segment 743. For example, the segment 743 can include a single annular segment or a single circumferential row of segments (e.g., a middle circle), and the segment 744 can include a first annular segment or circumferential row 745 disposed radially outward of the segment 743 (e.g., an outer circle) and can include a second annular segment or circumferential row 746 disposed radially inward of the segment 744 (e.g., an inner circle). Disposing the segment 744 at both radial sides of the segment 743 can increase axial penetration of fuel F into the combustion chamber 50, which can limit fuel F in the combustion chamber 50 at or near the wall 46, the fuel nozzle assembly 648, or both. The outer wall 740 can be tapered such that the first annular segment or circumferential row 745 extends farther axially (e.g., into the combustion chamber 50) than the segment 744, which can extend farther axially than the second annular segment or circumferential row 746.

The combustion chamber outlet 734 of the second fluid passage 730 can be disposed radially between the outlet 706 and the first outer fluid passage 742 such that steam S is provided between fuel F from the outlet 706 and air 70 from the first outer fluid passage 742, which can delay interaction between fuel F and air 70 in low velocity regions of the combustion chamber 50 near the wall 46, which can limit flashback, flameholding, and temperatures. The second combustion chamber outlet 735 (e.g., at the second annular segment or circumferential row 746) can be disposed, at least partially, radially between the first outer fluid passage 742 and the second outlet 707 such that steam S is provided between fuel F from the second outlet 707 and air 70 from the first outer fluid passage 742, which can delay interaction between fuel F and air 70 in low velocity regions of the combustion chamber 50 near the wall 46, which can limit flashback, flameholding, and temperatures. The fuel nozzle assembly 648 can facilitate mixing steam S and fuel F aft of the fuel nozzle assembly 648 before interacting with air 70, which can reduce flame speeds. In some nonlimiting examples, fuel F and steam S are not mixed within the fuel nozzle assembly 648.

Figure 11:
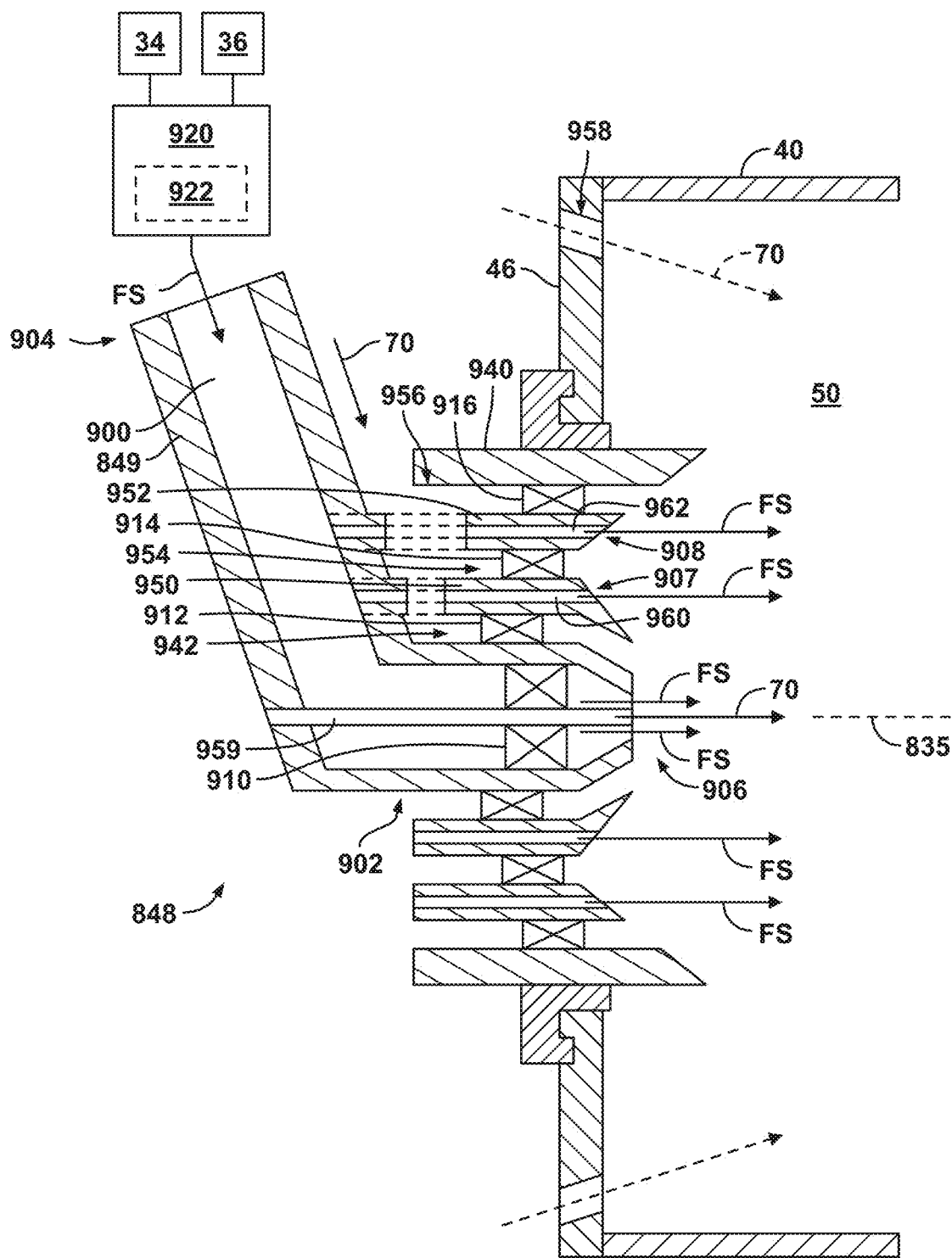
FIG. 11 is a schematic cross-sectional view illustrating portions of a fuel nozzle assembly coupled to a combustion chamber in accordance with various aspects described herein.
Figure 12:
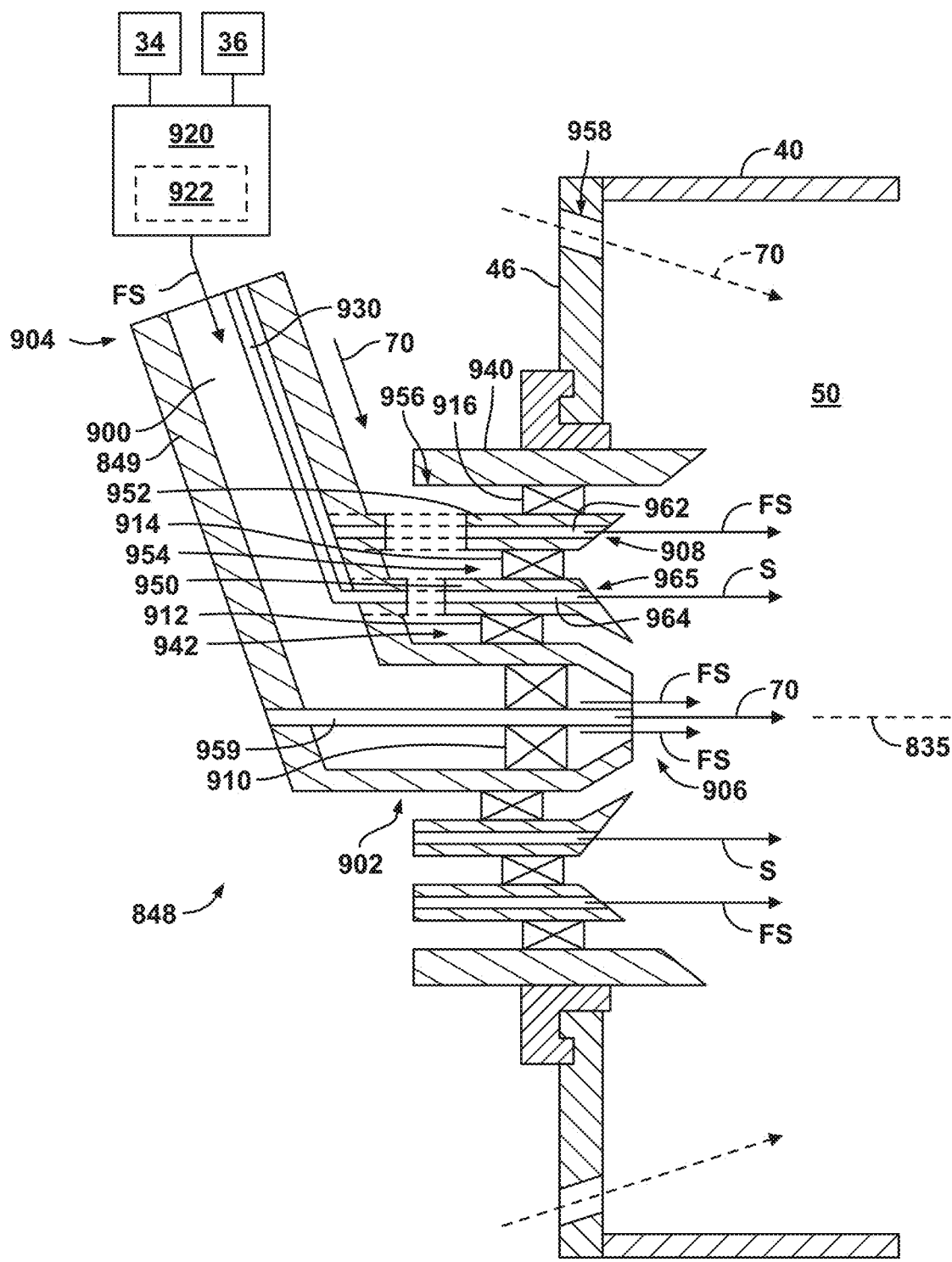
FIG. 12 is a schematic cross-sectional view illustrating portions of a fuel nozzle assembly coupled to a combustion chamber in accordance with various aspects described herein.

Referring to FIGS. 11 and 12, a fuel nozzle assembly 848 that can be utilized in the combustor 30 (FIG. 1) and coupled to the combustor liner 40, the wall 46, or both, is illustrated. The fuel nozzle assembly 848 can include aspects similar to those of the fuel nozzle assemblies 48 (FIG. 3), 248 (FIGS. 4 and 5), 448 (FIGS. 6-9), 648 (FIG. 10); therefore, like parts will be described with like numerals further increased by 200 relative to the fuel nozzle assembly 648 of FIG. 10, with it being understood that the description of the like parts of the fuel nozzle assembly 48, 248, 448, 648 can apply to the fuel nozzle assembly 848, except where noted. For example, the fuel nozzle assembly 848 can include a fuel nozzle body 849, can include a first fluid passage 900, can include an outer wall 940, and can fluidly couple the fuel supply 34 and the steam supply 36 to the combustion chamber 50. The fuel nozzle body 849 can include a first end 902 coupled to the wall 46 and a second end 904 opposite the first end 902. The first fluid passage 900 includes a first outlet 906. A first swirler 910 can be disposed in the first fluid passage 900, such as at the first end 902. The first fluid passage 900 can be fluidly coupled to the fuel supply 34 and the steam supply 36, such as via a manifold 920 that includes a mixing chamber 922, to emit the fuel-steam mixture FS into the combustion chamber 50.

The fuel nozzle assembly 848 can include a first intermediate wall 950 and a second intermediate wall 952. The first intermediate wall 950 can be disposed, at least partially, radially between the fuel nozzle body 849 (e.g., the first end 902) and the outer wall 940 such that a first outer fluid passage 942 is defined radially between the first intermediate wall 950 and the fuel nozzle body 849. A second swirler 912 can be disposed in the first outer fluid passage 942. The second intermediate wall 952 can be disposed, at least partially, radially between the first intermediate wall 950 and the outer wall 940 such that a second outer fluid passage 954 is defined, at least partially, radially between the first intermediate wall 950 and the second intermediate wall 952, and a third outer fluid passage 956 is defined, at least partially, radially between the second intermediate wall 952 and the outer wall 940. A third swirler 914 can be disposed in the second outer fluid passage 954. A fourth swirler 916 can be disposed in the third outer fluid passage 956. The first intermediate wall 950 can act as a splitter to split air 70 between the first outer fluid passage 942 and the second outer fluid passage 954. The second intermediate wall 952 can act as a splitter to split air 70 between the second outer fluid passage 954 and the third outer fluid passage 956. The wall 46 can include a wall air passage 958 that extends through the wall 46 to emit air 70 into the combustion chamber 50, such as to provide flame shaping and limit the flow of fuel F toward the combustor liner 40, the wall 46, or both, which can limit flashback, flameholding, and temperatures. The wall air passage 958 can be angled radially inward toward a fuel nozzle assembly centerline 835 of the fuel nozzle assembly 848, at least to some extent. The wall air passage 958 can comprise a plurality of wall air passages or a single annular air passage, for example. The fuel nozzle body 849 can include an air passage 959 that extends through at least a portion of the first fluid passage 900 to emit air 70 into the combustion chamber 50. For example, the air passage 959 can be aligned with a center of the first fluid passage 900 in the first end 902 of the fuel nozzle body 849 and emit air 70 at the center of the first outlet 906, such as along the fuel nozzle assembly centerline 835. The air passage 959 can emit air 70 to push recirculation of fuel F away from the fuel nozzle assembly 848 and the wall 46, which can limit flame propagation toward the fuel nozzle assembly 848 and the wall 46 and limit wear.

Referring to FIG. 11, the first fluid passage 900 can include a first segment 960 that extends from the fuel nozzle body 849 into and through (e.g., axially) the first intermediate wall 950 to emit the fuel-steam mixture FS into the combustion chamber 50. For example, the first segment 960 can provide the first fluid passage 900 with a second outlet 907 to emit the fuel-steam mixture FS into the combustion chamber 50. The first fluid passage 900 can include a second segment 962 that extends from the fuel nozzle body 849 into and through (e.g., axially) the second intermediate wall 952 to emit the fuel-steam mixture FS in the combustion chamber 50. For example, the second segment 962 can provide the first fluid passage 900 with a third outlet 908 to emit the fuel-steam mixture FS into the combustion chamber 50. Emitting the fuel-steam mixture FS from radially spaced outlets (e.g., multiple circuits), such as the first outlet 906, the second outlet 907, and the third outlet 908, can more evenly distribute fuel F and steam S, which can provide lower flame speeds to limit flashback and flameholding. While the first segment 960 and the second segment 962 are shown as fluidly coupled to a common portion of the first fluid passage 900, in some examples, the first fluid passage 900 can include separate portions for providing the fuel-steam mixture FS to the first segment 960 and the second segment 962 (e.g., from the manifold 920), which can allow for the first outlet 906, the second outlet 907, and the third outlet 908 to be independently controlled (e.g., amount of the fuel-steam mixture FS, steam to fuel ratio of the fuel-steam mixture FS, etc.), such as via the manifold 920. Increasing the steam S in the fuel-steam mixture FS can reduce temperatures in the combustion chamber 50, which can reduce $NO_x$ emissions.

Referring to FIG. 12, the fuel nozzle assembly 848 (e.g., the fuel nozzle body 849) can include a second fluid passage 930. The second fluid passage 930 can be fluidly coupled with the steam supply 36 and can include a second fluid passage segment 964 that extends into and through the first intermediate wall 950 to a second fluid passage outlet 965 to emit steam S into the combustion chamber 50. The fuel nozzle assembly 848 can include the second fluid passage segment 964 instead of the first segment 960 (FIG. 11) of the first fluid passage 900. Alternatively, the fuel nozzle assembly 848 can include the second fluid passage segment 964 in addition to the first segment 960 of FIG. 11 (e.g., the second fluid passage segment 964 and the first segment 960 of FIG. 11 can be circumferentially offset). In some examples, the second fluid passage segment 964 can extend through the second intermediate wall 952, such as instead of or in addition to the second segment 962. The second fluid passage segment 964 can emit steam S (e.g., without fuel F) radially between the fuel-steam mixture FS emitted from the first outlet 906 and from the third outlet 908, which can reduce temperatures and NO$_x$ emissions.

Figure 13:
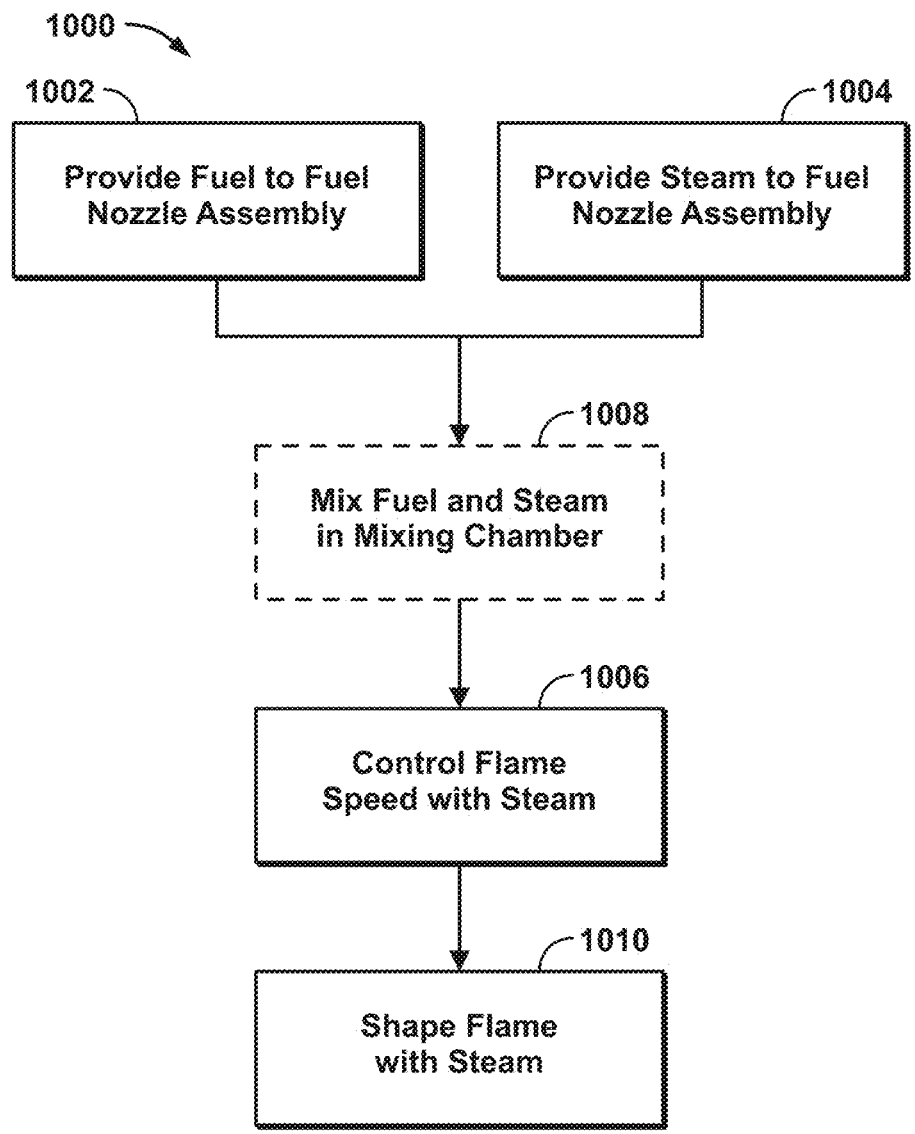
FIG. 13 is a block diagram depicting an embodiment of a method of operating a gas turbine engine in accordance with various aspects described herein.

Referring to FIG. 13, a method 1000 of operating a gas turbine engine is illustrated. The method 1000 can be utilized with the gas turbine engine 10 and components thereof, such as those generally illustrated in FIGS. 1-12. The method 1000 can comprise providing fuel F, such as gaseous hydrogen fuel, to a fuel nozzle assembly (block 1002) (e.g., a gaseous fuel nozzle assembly), which can include one or more of the fuel nozzle assemblies 48 (FIG. 3), 248 (FIGS. 4 and 5), 448 (FIGS. 6-9), 648 (FIG. 10), 848 (FIGS. 11 and 12), fluidly coupled with the combustion chamber 50. The method 1000 can include providing steam S to the fuel nozzle assembly 48, 248, 448, 648, 848 (block 1004). The method 1000 can include controlling a flame speed of a flame in the combustion chamber 50 by providing steam S from the fuel nozzle assembly 48, 248, 448, 648, 848 to the combustion chamber 50 (block 1006). Controlling the flame speed can, for example, include limiting the flame speed to a maximum speed of 6 meters per second, which can limit flashback. Controlling the flame speed can, for example, include limiting the flame speed to a maximum speed of 3 meters per second, which can further limit flashback. In some nonlimiting examples, the fuel F can be 100% hydrogen gas, the steam S can be 100% water vapor, or both. Providing steam S from the fuel nozzle assembly 48, 248, 448, 648, 848 to the combustion chamber 50 (FIGS. 2-12) (block 1004) can include emitting steam S into a first outer fluid passage 542 (FIGS. 6-9) of the fuel nozzle assembly 448 to mix steam S with air 70 (FIGS. 6-9) prior to mixing with fuel F, such as via one or more steam conduit outlets 538 (FIGS. 6-9) that can, for example, be disposed in a swirler (e.g., the second swirler 512 (FIGS. 6-9)). Optionally, the method 1000 can include mixing steam S and fuel F in a mixing chamber 122 (FIG. 3), 922 (FIGS. 11 and 12) fluidly coupled to an inlet of the fuel nozzle assembly 48, 248, 448, 648, 848 (block 1008). The method 1000 can include shaping the flame with steam S from the fuel nozzle assembly 48, 248, 448, 648, 848 (block 1010), which can include limiting the radial spread of fuel F by providing steam S from the fuel nozzle assembly 48, 248, 448, 648, 848 around fuel F from the fuel nozzle assembly 48, 248, 448, 648, 848.

The amount of steam S provided to the combustion chamber 50, such as via the steam supply 36 (FIGS. 2-12), the manifolds 120 (FIG. 3), 920 (FIGS. 11 and 12), or combinations thereof, can be controlled according to engine conditions, such as via the controller 60 (FIG. 2).

While second fluid passages, such as second fluid passages 330 (FIGS. 4 and 5), 530 (FIGS. 6-9), 730 (FIG. 10), 930 (FIG. 12), are described as fluidly coupled with the steam supply 36, the second fluid passages 330, 530, 730, 930 can, at least in some examples, also be fluidly coupled to the fuel supply 34, such as to provide a mixture of steam S and fuel F.

In some examples, the same combustor 30 (FIGS. 2-5) can include a combination of some or all of the different configurations of the fuel nozzle assemblies 48, 248, 448, 648, 848. The configurations of the fuel nozzle assemblies 48, 248, 448, 648, 848 are not mutually exclusive, unless expressly described as such, and can be combined in various manners in the same or different combustors.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor section, combustion section, and turbine section in serial flow arrangement, with the combustion section comprising: a combustor liner that at least partially defines a combustion chamber; and a gaseous fuel nozzle assembly, comprising: a steam supply to supply steam; a hydrogen fuel supply to supply gaseous hydrogen fuel; and a fuel nozzle body fluidly coupled with the steam supply and the hydrogen fuel supply to provide the steam and the gaseous hydrogen fuel to the combustion chamber to limit a flame speed in the combustion chamber.

The gas turbine engine of any preceding clause, wherein the gaseous fuel nozzle assembly includes a manifold with a mixing chamber fluidly coupled with the fuel nozzle body, the mixing chamber configured to mix the steam with the gaseous hydrogen fuel.

The gas turbine engine of any preceding clause, wherein the fuel nozzle body includes a first fluid passage fluidly coupled with the steam supply and the combustion chamber, and a second fluid passage fluidly coupled with the steam supply and at least one of the combustion chamber or the first fluid passage.

The gas turbine engine of any preceding clause, wherein the second fluid passage includes a plurality of orifices fluidly coupled with the first fluid passage to permit the steam to flow from the second fluid passage into the first fluid passage to mix with the gaseous hydrogen fuel in the first fluid passage.

The gas turbine engine of any preceding clause, wherein the gaseous fuel nozzle assembly includes a swirler in the first fluid passage; and wherein the plurality of orifices is upstream of the swirler.

The gas turbine engine of any preceding clause, wherein the gaseous fuel nozzle assembly includes a swirler in the first fluid passage; and wherein the plurality of orifices includes at least one orifice upstream of the swirler to facilitate mixing of the steam with the gaseous hydrogen fuel, and at least one orifice downstream of the swirler for flame shaping.

The gas turbine engine of any preceding clause, wherein the gaseous fuel nozzle assembly includes a steam conduit fluidly coupled with the second fluid passage and extending radially outward from the fuel nozzle body.

The gas turbine engine of claim any preceding clause, wherein the gaseous fuel nozzle assembly includes an outer wall radially spaced from a first end of the fuel nozzle body such that a first outer fluid passage is at least partially defined between the outer wall and the fuel nozzle body.

The gas turbine engine of any preceding clause, wherein the steam conduit extends radially outward into the outer wall and axially aft through the outer wall to emit steam into the combustion chamber.

The gas turbine engine of any preceding clause, wherein the steam conduit includes a plurality of steam conduit outlets disposed in the first outer fluid passage.

The gas turbine engine of any preceding clause, wherein the gaseous fuel nozzle assembly includes a swirler disposed in the first outer fluid passage.

The gas turbine engine of any preceding clause, wherein the outer wall includes an air passage to emit air into the combustion chamber.

The gas turbine engine of any preceding clause, wherein the fuel nozzle body includes a first fluid passage fluidly coupled with the steam supply and the combustion chamber, and a second fluid passage fluidly coupled with the steam supply and at least one of the combustion chamber or the first fluid passage; wherein the gaseous fuel nozzle assembly includes an outer wall radially spaced from a first end of the fuel nozzle body such that a first outer fluid passage is at least partially defined between the outer wall and the fuel nozzle body; wherein the first fluid passage includes a first segment that extends through the outer wall to emit the gaseous hydrogen fuel into the combustion chamber; and wherein the second fluid passage includes a second segment that extends through the outer wall and at least partially around the first segment to emit the steam into the combustion chamber.

The gas turbine engine of any preceding clause, wherein the gaseous fuel nozzle assembly includes: an outer wall radially spaced from a first end of the fuel nozzle body, a first intermediate wall disposed at least partially between the outer wall and the nozzle body, a second intermediate wall disposed at least partially between the first intermediate wall and the outer wall, and a first fluid passage fluidly coupled with at least one of the hydrogen fuel supply and the steam supply; and wherein the first fluid passage includes a first segment extending through the second intermediate wall to the combustion chamber.

The gas turbine engine of any preceding clause, wherein the first fluid passage is fluidly coupled with the hydrogen fuel supply and the steam supply via a manifold; wherein the gaseous fuel nozzle assembly includes a second fluid passage fluidly coupled with the steam supply; and wherein the second fluid passage includes a second segment extending through the first intermediate wall to emit the steam into the combustion chamber.

The gas turbine engine of any preceding clause, wherein the gaseous hydrogen fuel is 100% hydrogen gas.

A method of operating a gas turbine engine having a compressor section, a combustion section including a combustion chamber, and a turbine section in a serial flow arrangement, the method comprising: providing gaseous hydrogen fuel to a gaseous fuel nozzle assembly fluidly coupled with the combustion chamber; providing steam to the gaseous fuel nozzle assembly; and controlling a flame speed of a flame in the combustion chamber by providing the steam from the gaseous fuel nozzle assembly to the combustion chamber.

The method of any preceding clause, wherein the controlling the flame speed includes limiting the flame speed to a maximum speed of 6 meters per second.

The method of any preceding clause, wherein the controlling the flame speed includes limiting the flame speed to a maximum speed of 3 meters per second.

The method of any preceding clause, wherein providing the steam from the gaseous fuel nozzle assembly to the combustion chamber includes emitting the steam into a first outer fluid passage of the fuel nozzle assembly to mix the steam with air prior to mixing with the gaseous hydrogen fuel.

The method of any preceding clause, wherein the gaseous hydrogen fuel is 100% hydrogen gas.

The method of claim any preceding clause, further comprising mixing the steam and the gaseous hydrogen fuel in a mixing chamber fluidly coupled to an inlet of the gaseous fuel nozzle assembly.

The method of any preceding clause, further comprising shaping the flame with the steam from the gaseous fuel nozzle assembly.

The method of any preceding clause, further comprising limiting radial spread of the flame by providing the steam from the gaseous fuel nozzle assembly around the gaseous hydrogen fuel from the gaseous fuel nozzle assembly.

A method of operating a gas turbine engine having a compressor section, a combustion section including a combustion chamber, and a turbine section in a serial flow arrangement, the method comprising: providing fuel to a fuel nozzle assembly fluidly coupled with the combustion chamber; providing steam to the gaseous fuel nozzle assembly; and controlling a flame speed of a flame in the combustion chamber by providing the steam from the gaseous fuel nozzle assembly to the combustion chamber.

A gaseous fuel nozzle assembly, comprising: a steam supply to supply steam; a hydrogen fuel supply to supply gaseous hydrogen fuel; and a fuel nozzle body fluidly coupled with the steam supply and the hydrogen fuel supply to provide the steam and the gaseous hydrogen fuel to a combustion chamber.

The gaseous fuel nozzle assembly of any preceding clause, further comprising a manifold with a mixing chamber fluidly coupled with the fuel nozzle body, the mixing chamber configured to mix the steam with the gaseous hydrogen fuel.

The gaseous fuel nozzle assembly of any preceding clause, wherein the fuel nozzle body includes a first fluid passage fluidly coupled with the steam supply and the combustion chamber, and a second fluid passage fluidly coupled with the steam supply and at least one of the combustion chamber or the first fluid passage.

The gaseous fuel nozzle assembly of any preceding clause, wherein the second fluid passage includes a plurality of orifices fluidly coupled with the first fluid passage to permit the steam to flow from the second fluid passage into the first fluid passage to mix with the gaseous hydrogen fuel in the first fluid passage.

The gaseous fuel nozzle assembly of any preceding clause, further comprising a swirler in the first fluid passage; and wherein the plurality of orifices is upstream of the swirler.

The gaseous fuel nozzle assembly of any preceding clause, further comprising a swirler in the first fluid passage; wherein the plurality of orifices includes at least one orifice upstream of the swirler to facilitate mixing of the steam with the gaseous hydrogen fuel, and at least one orifice downstream of the swirler for flame shaping.

The gaseous fuel nozzle assembly of any preceding clause, further comprising a steam conduit fluidly coupled with the second fluid passage and extending radially outward from the fuel nozzle body.

The gaseous fuel nozzle assembly of any preceding clause, further comprising an outer wall radially spaced from a first end of the fuel nozzle body such that a first outer fluid passage is at least partially defined between the outer wall and the fuel nozzle body.

The gaseous fuel nozzle assembly of any preceding clause, wherein the steam conduit extends radially outward into the outer wall and axially aft through the outer wall to emit steam into the combustion chamber.

The gaseous fuel nozzle assembly of any preceding clause, wherein the fluid conduit includes a plurality of steam conduit outlets disposed in the first outer fluid passage.

The gaseous fuel nozzle assembly of any preceding clause, wherein the further comprising a swirler disposed in the first outer fluid passage.

The gaseous fuel nozzle assembly of any preceding clause, wherein the outer wall includes an air passage to emit air into the combustion chamber.

The gaseous fuel nozzle assembly of any preceding clause, wherein the fuel nozzle body includes a first fluid passage fluidly coupled with the steam supply and the combustion chamber, and a second fluid passage fluidly coupled with the steam supply and at least one of the combustion chamber or the first fluid passage; wherein the gaseous fuel nozzle assembly includes an outer wall radially spaced from a first end of the fuel nozzle body such that a first outer fluid passage is at least partially defined between the outer wall and the fuel nozzle body; wherein the first fluid passage includes a first segment that extends through the outer wall to emit the gaseous hydrogen fuel into the combustion chamber; and wherein the second fluid passage includes a second segment that extends through the outer wall and at least partially around the first segment to emit the steam into the combustion chamber.

The gaseous fuel nozzle assembly of any preceding clause, further comprising an outer wall radially spaced from a first end of the fuel nozzle body, a first intermediate wall disposed at least partially between the outer wall and the nozzle body, a second intermediate wall disposed at least partially between the first intermediate wall and the outer wall, and a first fluid passage fluidly coupled with at least one of the fuel supply and the steam supply; wherein the first fluid passage includes a segment extending through the second intermediate wall to the combustion chamber.

The gaseous fuel nozzle assembly of any preceding clause, wherein the first fluid passage is fluidly coupled with the hydrogen fuel supply and the steam supply via a manifold; wherein gaseous fuel nozzle assembly includes a second fluid passage fluidly coupled with the steam supply; and wherein the second fluid passage includes a segment extending through the first intermediate wall to emit the steam into the combustion chamber.

What is claimed is:

1. A gas turbine engine, comprising:
    a compressor section, combustion section, and turbine section in serial flow arrangement, with the combustion section comprising:
        a combustor liner that at least partially defines a combustion chamber; and
        a gaseous fuel nozzle assembly, comprising:
            a steam supply to supply steam;
            a hydrogen fuel supply to supply gaseous hydrogen fuel; and
            a fuel nozzle body fluidly coupled with the steam supply and the hydrogen fuel supply to provide the steam and the gaseous hydrogen fuel to the combustion chamber to limit a flame speed in the combustion chamber;
        wherein the fuel nozzle body includes a first fluid passage and a second fluid passage;
        wherein the first fluid passage is fluidly coupled with the hydrogen fuel supply;
        wherein the second fluid passage is fluidly coupled with the steam supply and includes an annular configuration disposed at least partially around the first fluid passage; and
        wherein the second fluid passage includes a plurality of orifices fluidly coupled with the first fluid passage to enable the steam to flow from the second fluid passage into the first fluid passage to mix with the gaseous hydrogen fuel in the first fluid passage.

2. The gas turbine engine of claim 1, wherein the first fluid passage is fluidly coupled with the combustion chamber, and the second fluid passage is fluidly coupled with at least one of the combustion chamber or the first fluid passage.

3. The gas turbine engine of claim 2, wherein the gaseous fuel nozzle assembly includes a steam conduit fluidly coupled with the second fluid passage and extending radially outward from the fuel nozzle body.

4. The gas turbine engine of claim 3, wherein the gaseous fuel nozzle assembly includes an outer wall radially spaced from a first end of the fuel nozzle body such that a first outer fluid passage is at least partially defined between the outer wall and the fuel nozzle body.

5. The gas turbine engine of claim 4, wherein the steam conduit includes a plurality of steam conduit outlets disposed in the first outer fluid passage.

6. The gas turbine engine of claim 5, wherein the gaseous fuel nozzle assembly includes a swirler disposed in the first outer fluid passage.

7. The gas turbine engine of claim 6, wherein the outer wall includes an air passage to emit air into the combustion chamber.

8. The gas turbine engine of claim 1, wherein the gaseous fuel nozzle assembly includes a swirler in the first fluid passage; and
    wherein the plurality of orifices is upstream of the swirler.

9. The gas turbine engine of claim 1, wherein the gaseous fuel nozzle assembly includes a swirler in the first fluid passage; and
    wherein the plurality of orifices includes at least one orifice upstream of the swirler to facilitate mixing of the steam with the gaseous hydrogen fuel, and at least one orifice downstream of the swirler for flame shaping.

10. The gas turbine engine of claim 1, wherein the gaseous fuel nozzle assembly includes:
    an outer wall radially spaced from a first end of the fuel nozzle body,
    a first intermediate wall disposed at least partially between the outer wall and the fuel nozzle body,
    a second intermediate wall disposed at least partially between the first intermediate wall and the outer wall, and
    a first fluid passage fluidly coupled with at least one of the hydrogen fuel supply and the steam supply; and
    wherein the first fluid passage includes a first segment extending through the second intermediate wall to the combustion chamber.

11. The gas turbine engine of claim 1, wherein the gaseous hydrogen fuel is 100% hydrogen gas.

12. A gas turbine engine, comprising:
a compressor section, combustion section, and turbine section in serial flow arrangement, with the combustion section comprising:
a combustor liner that at least partially defines a combustion chamber; and
a gaseous fuel nozzle assembly, comprising:
a steam supply to supply steam:
a hydrogen fuel supply to supply gaseous hydrogen fuel; and
a fuel nozzle body fluidly coupled with the steam supply and the hydrogen fuel supply to provide the steam and the gaseous hydrogen fuel to the combustion chamber to limit a flame speed in the combustion chamber:
wherein the fuel nozzle body includes a first fluid passage and a second fluid passage;
wherein the first fluid passage is fluidly coupled with the hydrogen fuel supply;
wherein the second fluid passage is fluidly coupled with the steam supply and includes an annular configuration disposed at least partially around the first fluid passage;
wherein the first fluid passage is fluidly coupled with the combustion chamber, and the second fluid passage is fluidly coupled with at least one of the combustion chamber or the first fluid passage;
wherein the gaseous fuel nozzle assembly includes a steam conduit fluidly coupled with the second fluid passage and extending radially outward from the fuel nozzle body; and
wherein the gaseous fuel nozzle assembly includes an outer wall radially spaced from a first end of the fuel nozzle body such that a first outer fluid passage is at least partially defined between the outer wall and the fuel nozzle body; and
wherein the steam conduit extends radially outward into the outer wall and axially aft through the outer wall to emit steam into the combustion chamber.

13. A gas turbine engine, comprising:
a compressor section, combustion section, and turbine section in serial flow arrangement, with the combustion section comprising:
a combustor liner that at least partially defines a combustion chamber; and
a gaseous fuel nozzle assembly, comprising:
a steam supply to supply steam;
a hydrogen fuel supply to supply gaseous hydrogen fuel; and
a fuel nozzle body fluidly coupled with the steam supply and the hydrogen fuel supply to provide the steam and the gaseous hydrogen fuel to the combustion chamber to limit a flame speed in the combustion chamber;
wherein the fuel nozzle body includes a first fluid passage and a second fluid passage;
wherein the first fluid passage is fluidly coupled with the hydrogen fuel supply;
wherein the second fluid passage is fluidly coupled with the steam supply and includes an annular configuration disposed at least partially around the first fluid passage;
wherein the gaseous fuel nozzle assembly includes an outer wall radially spaced from a first end of the fuel nozzle body such that a first outer fluid passage is at least partially defined between the outer wall and the fuel nozzle body;
wherein the first fluid passage includes a first segment that extends through the outer wall to emit the gaseous hydrogen fuel into the combustion chamber; and
wherein the second fluid passage includes a second segment that extends through the outer wall and at least partially around the first segment to emit the steam into the combustion chamber.

14. A gas turbine engine, comprising:
a compressor section, combustion section, and turbine section in serial flow arrangement, with the combustion section comprising:
a combustor liner that at least partially defines a combustion chamber; and
a gaseous fuel nozzle assembly, comprising:
a steam supply to supply steam:
a hydrogen fuel supply to supply gaseous hydrogen fuel; and
a fuel nozzle body fluidly coupled with the steam supply and the hydrogen fuel supply to provide the steam and the gaseous hydrogen fuel to the combustion chamber to limit a flame speed in the combustion chamber;
wherein the gaseous fuel nozzle assembly includes a manifold with a mixing chamber fluidly coupled with the fuel nozzle body, the mixing chamber configured to mix the steam with the gaseous hydrogen fuel; and
wherein the manifold is separate from the fuel nozzle body;
wherein the gaseous fuel nozzle assembly includes:
an outer wall radially spaced from a first end of the fuel nozzle body,
a first intermediate wall disposed at least partially between the outer wall and the fuel nozzle body,
a second intermediate wall disposed at least partially between the first intermediate wall and the outer wall, and
wherein the first fluid passage includes a first segment extending through the second intermediate wall to the combustion chamber;
wherein the gaseous fuel nozzle assembly includes a first fluid passage fluidly coupled with the hydrogen fuel supply and the steam supply via the manifold;
wherein the gaseous fuel nozzle assembly includes a second fluid passage fluidly coupled with the steam supply; and
wherein the second fluid passage includes a second segment extending through the first intermediate wall to emit the steam into the combustion chamber.

* * * * *